United States Patent [19]

Hebb

[11] Patent Number: 5,757,796
[45] Date of Patent: May 26, 1998

[54] ATM ADDRESS TRANSLATION METHOD AND APPARATUS

[75] Inventor: Andrew T. Hebb, Hudson, Mass.

[73] Assignee: Cascade Communications Corp., Westford, Mass.

[21] Appl. No.: 639,228

[22] Filed: Apr. 26, 1996

[51] Int. Cl.$^6$ .......................................... H04L 12/56
[52] U.S. Cl. ..................... 370/393; 370/397; 370/399
[58] Field of Search .......................... 370/389, 392, 370/393, 395, 397, 399; 395/410, 412, 421.02; 365/49

[56] References Cited

U.S. PATENT DOCUMENTS

| | | | |
|---|---|---|---|
| 5,067,123 | 11/1991 | Hyodo et al. | 370/58.1 |
| 5,119,369 | 6/1992 | Tanabe et al. | 370/60 |
| 5,249,178 | 9/1993 | Kurano et al. | 370/60 |
| 5,271,010 | 12/1993 | Miyake et al. | 370/392 |
| 5,280,475 | 1/1994 | Yanagi et al. | 370/60 |
| 5,280,476 | 1/1994 | Kojima et al. | 370/60.1 |
| 5,287,535 | 2/1994 | Sakagawa et al. | 370/60 |
| 5,394,397 | 2/1995 | Yanagi et al. | 370/60.1 |
| 5,400,325 | 3/1995 | Chatwani et al. | 370/60.1 |
| 5,408,469 | 4/1995 | Opher et al. | 370/60.1 |
| 5,414,701 | 5/1995 | Shyayer et al. | 370/58.2 |
| 5,414,702 | 5/1995 | Kudoh | 370/60 |
| 5,422,838 | 6/1995 | Lin | 365/49 |
| 5,430,715 | 7/1995 | Corbalis et al. | 370/392 |
| 5,432,777 | 7/1995 | Le Boudec et al. | 370/60 |
| 5,440,552 | 8/1995 | Sugita | 370/60 |
| 5,444,702 | 8/1995 | Burnett et al. | 370/60 |
| 5,446,726 | 8/1995 | Rostoker et al. | 370/17 |
| 5,450,399 | 9/1995 | Sugita | 370/60.1 |
| 5,450,406 | 9/1995 | Esaki et al. | 370/60.1 |
| 5,452,296 | 9/1995 | Shimizu | 370/60.1 |
| 5,457,687 | 10/1995 | Newman | 370/85.3 |
| 5,459,743 | 10/1995 | Fukuda et al. | 371/67.1 |
| 5,467,349 | 11/1995 | Huey et al. | 370/60.1 |
| 5,481,687 | 1/1996 | Goubert et al. | 395/421.02 |
| 5,490,140 | 2/1996 | Abensour et al. | 370/60.1 |
| 5,530,806 | 6/1996 | Condon et al. | 395/185.02 |

*Primary Examiner*—Hassan Kizou
*Attorney, Agent, or Firm*—Weingarten, Schurgin, Gagnebin & Hayes LLP

[57] ABSTRACT

A method and apparatus for performing address translation in an ATM network element, such as a switch, resulting in minimized circuit complexity and resultant cost savings. The present invention includes the generation of a simplified local address from elements of internetwork communications, the local address being suitable for addressing a routing table in the network element. Components of the local address are also individually employed as masks for out-of-range checking.

16 Claims, 5 Drawing Sheets

| 0 | 0 | 0 | 0 | 0 | 0 | 1 | 0 | 0 | 0 | 1 | 0 | 0 | 1 | 1 | 0 |

VPI RECEIVED (0226X)

| 0 | 0 | 0 | 0 | 0 | 0 | 0 | 0 | 0 | 0 | 0 | 1 | 1 | 1 | 1 | 1 |

VPI MASK (001FX)

| 0 | 0 | 0 | 0 | 0 | 0 | 0 | 0 | 0 | 0 | 0 | 0 | 1 | 1 | 1 | 0 |

VPI TRUNCATED (0006X)

| 0 | 0 | 0 | 0 | 0 | 0 | 1 | 0 | 0 | 0 | 1 | 0 | 0 | 0 | 0 | 0 |

"XOR" OF VPI RECEIVED AND VPI TRUNCATED

| 1 |

"OR" OF ALL "XOR" BITS

| 1 | 0 | 1 | 0 | 1 | 0 | 0 | 0 | 0 | 0 | 0 | 0 | 0 | 0 | 0 |

VPI TRUNCATED AND REVERSED (A800X)

| 0 | 0 | 0 | 0 | 0 | 0 | 0 | 0 | 0 | 0 | 0 | 0 | 1 | 0 | 1 |

VCI TRUNCATED (0005X)

| 1 | 0 | 1 | 0 | 1 | 0 | 0 | 0 | 0 | 0 | 0 | 1 | 0 | 1 |

VPI           VCI
LSB   MSB     MSB   LSB

ATM ADDRESS TRANSLATION METHOD AND APPARATUS

FIELD OF THE INVENTION

The invention generally relates to the field of network communications, and specifically to methods and apparatus for address translation and manipulation in an ATM switch.

BACKGROUND OF THE INVENTION

An Asynchronous Transfer Mode (ATM) Protocol Data Unit (PDU), also referred to as a cell, includes a five octet long header and a forty-eight octet long cell payload. The interpretation of the header configuration depends upon the type of interface receiving the cell, such as User-Network Interface (UNI) or Network-Network Interface (NNI). Regardless, ATM addressing encompasses a large range of addresses as provided through a Virtual Path Identifier (VPI)/Virtual Circuit Identifier (VCI) pair in each cell, the latter pair identifying a specific end user for a virtual circuit.

It is required that each network element such as a switch support a contiguous range of these addresses from zero up to the limit of the supported capability of the element. Not all possible VPI/VCI address combinations are utilized in ATM networks presently; it is common practice to translate the large address space addressable by the VPI/VCI pair into a smaller address space using address translation, whereby the incoming VPI/VCI pair is mapped into a local address or similar internal identification for referencing a local routing table. For example, an ATM switch examines the routing table to match the VPI, VCI and port number of the incoming cell to that of an outgoing VPI and VCI number and corresponding outgoing port. The header in the outgoing cell is provided with the new VPI and VCI values for use by subsequent a switch. This process is repeated until the cell reaches the final terminating UNI.

Typical prior art address translation approaches include the concatenation of VPI to the VCI to form the least significant bit (LSB) portion of the local address. For different range values of VCI, all bits of the VPI need to be relocated, resulting in greater complexity of logic.

Further, out-of-range checking on incoming VPI and VCI pairs must be implemented separately from the address translation logic, resulting in increased complexity and cost due to the added circuitry. In implementations using Field Programmable Gate Arrays (FPGA's), minimized gate count is necessary to minimize product cost; the prior art complexity necessarily results in higher gate count and thus higher product cost.

SUMMARY OF THE INVENTION

The present invention provides a unique method and apparatus for performing an address translation in an ATM network element, such as a switch, resulting in minimized circuit complexity and resultant cost savings. Specifically, the present invention is directed towards address translation in preparation for addressing a virtual circuit table (VCT).

The present invention includes the identification of a range of significant bits for VPI and VCI which will be supported. VPI and VCI values from received cells are truncated according to the identified range of values. The truncated values are then zero-extended as required to equal the length of the total number of connections supported. One of the two zero-extended values, VPI or VCI, is then reversed and logically OR'd with the remaining zero-extended, non-reversed value to form a local address suitable for addressing the virtual circuit table.

Each of the truncated, zero-extended values of VPI and VCI are also individually employed as masks for out-of-range checking. The non-truncated version of VPI or VCI, as received, is exclusive-OR'd (XOR'd) with the respective truncated, zero-extended version of either VPI or VCI. The resulting bits of the XOR are OR'd together. If any bits of VPI or VCI, as received, beyond the range supported by this network element are set, one or more bits of the XOR result will have the value of "one". Thus, the result of the respective OR operation will also be a "one". This then indicates that the value of VPI or VCI as received is out of range.

Since the least significant bits of each field (VPI or VCI) are at a fixed location within the local address, implementation complexity is reduced compared to prior art concatenation approaches. Specifically, many of the functions involved in the foregoing manipulations of VPI and VCI are implemented via hardwiring, rather than requiring use of expensive gates in a Field Programmable Gate Array (FPGA).

BRIEF DESCRIPTION OF THE DRAWINGS

The invention will be more fully understood by reference to the following description and accompanying drawings of which.

DETAILED DESCRIPTION

An Asynchronous Transfer Mode (ATM) switch interprets an incoming Protocol Data Unit (PDU), referred to as a cell, as part of a process of redirecting the cell through the switch. The cell is 53 octets in length, of which the initial five octets are referred to as an ATM cell header, the remaining forty-eight octets being a cell payload defined by the user and/or by the ATM application layer (AAL). The cell header includes the virtual circuit labels of Virtual Path Identifier (VPI) and Virtual Circuit Identifier (VCI).

Figure 1A:
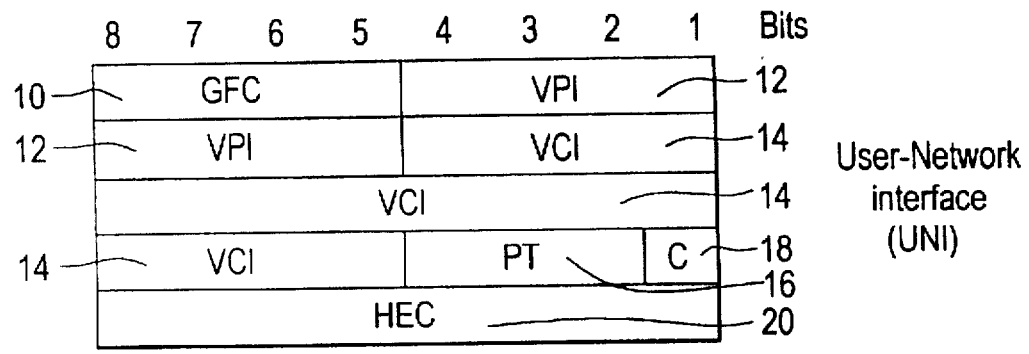
FIGS. 1A and 1B are ATM cell headers as employed in the art.

The type of interface receiving the cell defines the interpretation of the cell header. For instance, various Operations, Administration, and Maintenance (OAM) functions are carried out at a User-Network Interface (UNI), but not at a Network-Network Interface (NNI). As illustrated in FIG. 1A, traffic traversing a UNI is interpreted as including a cell header having an initial four bit flow control field labelled Generic Flow Control (GFC) 10. Additionally, UNI traffic includes an eight, bit VPI field 12 and a sixteen bit VCI field 14. Other fields included in the UNI header include a three bit payload type (PT) 16, a one bit cell loss priority flag (C) 18, and an eight bit header error control (HEC) field 20.

Figure 1B:
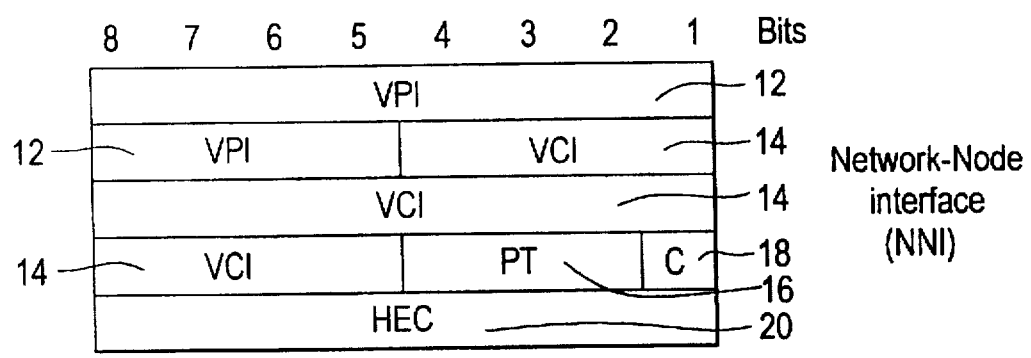

As illustrated in FIG. 1B, for an NNI, a flow control field is not employed, and the VPI field 12 is comprised of the initial twelve bits, while the VCI field 14 is sixteen bits long. The remainder of the NNI header is the same as for the UNI header.

In redirecting an ATM cell, an ATM switch must interpret, among other elements, the values of VPI and VCI in order to address a local look-up table of internal address values. In a first embodiment of a switch embodying the present invention, the local look-up table is divided into two sections, the first as a virtual path table (VPT), and the second as a virtual circuit table (VCT). The initial reference to the local look-up table employs the encoded source address of the cell from the physical links (i.e. the port on which the cell was received) in addition to the VPI values to address the VPT section of the table. The addressed location in the VPT includes: a valid bit to prevent cells with unexpected VPI values from being directed into the switch fabric with improper header information from subsequent look-ups; a path bit to indicate whether the entry is path switched or circuit switched; and fourteen bits of connection table address to be used in a subsequent stage of the switch.

If the valid bit in the foregoing addressed location is set (indicating a valid VPI value), and the path bit is not set (indicating that the cell entry is to be circuit switched, not path switched), VCT look-up commences. The present invention pertains in particular to address generation for VCT look-up.

This invention indexes into a second portion of the local routing table referred to as the virtual circuit table (VCT). The VCT is employed to extract a circuit table address if the cell in question is to be circuit switched, the address in this instance being employed for subsequent look-up addressing. The VCT in this first embodiment is provided with the capacity for 16K addresses for each physical link, and is thus addressed by a maximum of fourteen bits.

The MSB of the virtual circuit address is comprised of the encoded source address from the physical link over which the instant cell was received. The remaining bits of the address are generated according to the following description.

Figures 2, 3, 4:
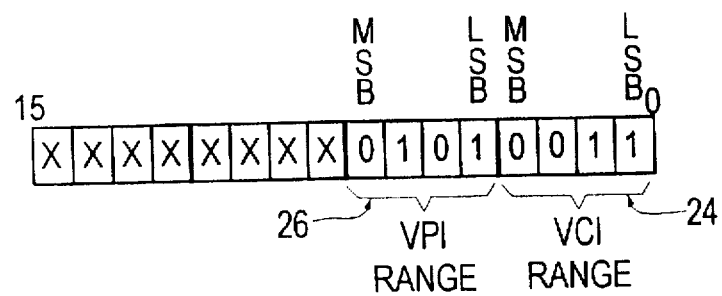
FIG. 2 is an exemplary range register as employed in the address translation of the present invention.
FIG. 3 represents a received VPI value and various manipulations thereof in accordance with the present invention.
FIG. 4 represents a received VCI value and various manipulations thereof in accordance with the present invention.

Each switch maintains a range register associated with each physical port, the register providing a limit on the number of least significant bits (LSBs) supported for both VPI and VCI. In a first embodiment of the present invention, as illustrated in FIG. 2, the range registers 22 are each maintained in one sixteen-bit word which can be implemented in a look-up table. Four bits of the sixteen-bit register 22 provide a range of VPI bits 24 supported at this port (zero to fourteen), and four bits of the register 22 provide a range of VCI bits 26 so supported (zero to fourteen). The number of bits supported for VPI and VCI is limited, in this embodiment, according to the following rule:

$$VPI_{rng} + VCI_{rng} \leq 14 \text{ bits}$$

The fourteen bit maximum provides 16K addresses per physical port. In alternative embodiments, however, the number of addresses per port maybe more or less than 16K.

As illustrated, the range register for VCI 24 for this port indicates that the three LSBs of the received VCI are supported, and the range register for VPI 26 for this port indicates that the five LSBs of the received VPI are supported. The remaining bits of the range register word are "don't care" in this embodiment. The values of the range registers can be established statically at switch configuration via a kernel.

If any unused VPI or VCI bits in the incoming cell are set, the cell is invalid and is not forwarded to the next stage of inter-switch address look-up. Various subsequent functions can be executed as a result of this error condition, such as the incrementing of an "invalid counter" and the storage of the invalid header. The analysis of VPI and VCI values for invalidity is described subsequently.

The range register values in FIG. 2, five for VPI and three for VCI, are applied as a mask to the incoming values of VPI and VCI, respectively, in order to create a truncated version of each. For instance, as in FIG. 3, if the incoming value of VPI is 0015X, it is OR'd with a mask of 001F hex (enabling the five LSB's), resulting in a truncated VPI value of 0015 hex. If the incoming value for VCI is 0005 hex, as in FIG. 4, it is OR'd with a mask of 0007 hex (enabling the three LSB's), resulting in a truncated VPI value of 0005 hex. In each of these examples, it will be noted that the truncated value is the same as the received value.

In order to perform out-of-range checking on the values of VPI and VCI in the received cell header, the received values are exclusive-OR'd (XOR'd) with the respective truncated versions of VPI or VCI. With regard to FIG. 5, assume the received VPI value is 0226 hex. Applying the same range register mask as in FIG. 3, 001Fhex, the truncated result is 0006 hex. To perform out-of-range checking, the received VPI value of 0226 hex is XOR'd with the truncated value of 0006 hex to yield 0220 hex. All of the bits in the result of the XOR are then OR'd together to yield a "1", indicative of an out-of-range value for VPI. In other words, the switch of the present embodiment is only configured for processing VPI values up to 001F hex. As stated above, an "invalid counter" is incremented and the header value is stored for later analysis.

After being truncated, the received VPI value is reversed such that the value reads from LSB to MSB. FIG. 3 further illustrates this reversal.

Figures 5, 6:
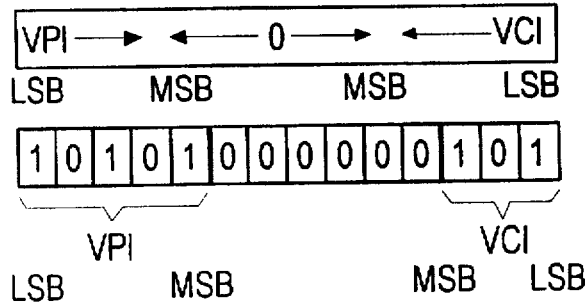
FIG. 5 represents an alternative received VPI value and various manipulations thereof in accordance with the present invention.
FIG. 6 illustrates the generation of a port-specific routing table address in accordance with the present invention.

In the presently described embodiment, each port has associated therewith a 16K×16 memory of addresses employed subsequently in the switch fabric. Fourteen bits are required to address 16K for each port. This is reflected in the fourteen bit maximum rule stated above. A 14 bit address is constructed from the received values of VPI and VCI. With reference to FIG. 6, the truncated, reversed VPI and the truncated VCI values are reproduced. Next is illustrated the arrangement of the fourteen bit address: the truncated VCI value is inserted at the LSB end of the address; the truncated, reversed VPI value is inserted at the MSB end of the address; and zero padding is provided between the two if space permits (i.e. if the number of VPI bits plus the number of VCI bits is less than fourteen). The resulting address based on the VPI and VCI values of the example is also illustrated.

A principal benefit of the presently disclosed address translation technique is that adjustment of the range value for either or both of VPI and VCI is easily accommodated; zero padding is either added or removed as the two values move towards or away from each other. A further benefit of the presently disclosed invention is the ability to implement the truncating, reversing and routing table address generation steps in hardware, thus obviating the need for excess gates when a Field Programmable Gate Array (FPGA) is employed, and further minimizing software control.

As noted, each port has an associated 16K×16 memory. Thus, the routing table memory is addressed by concatenating a port address with the previously described fourteen bit address.

Figure 7:
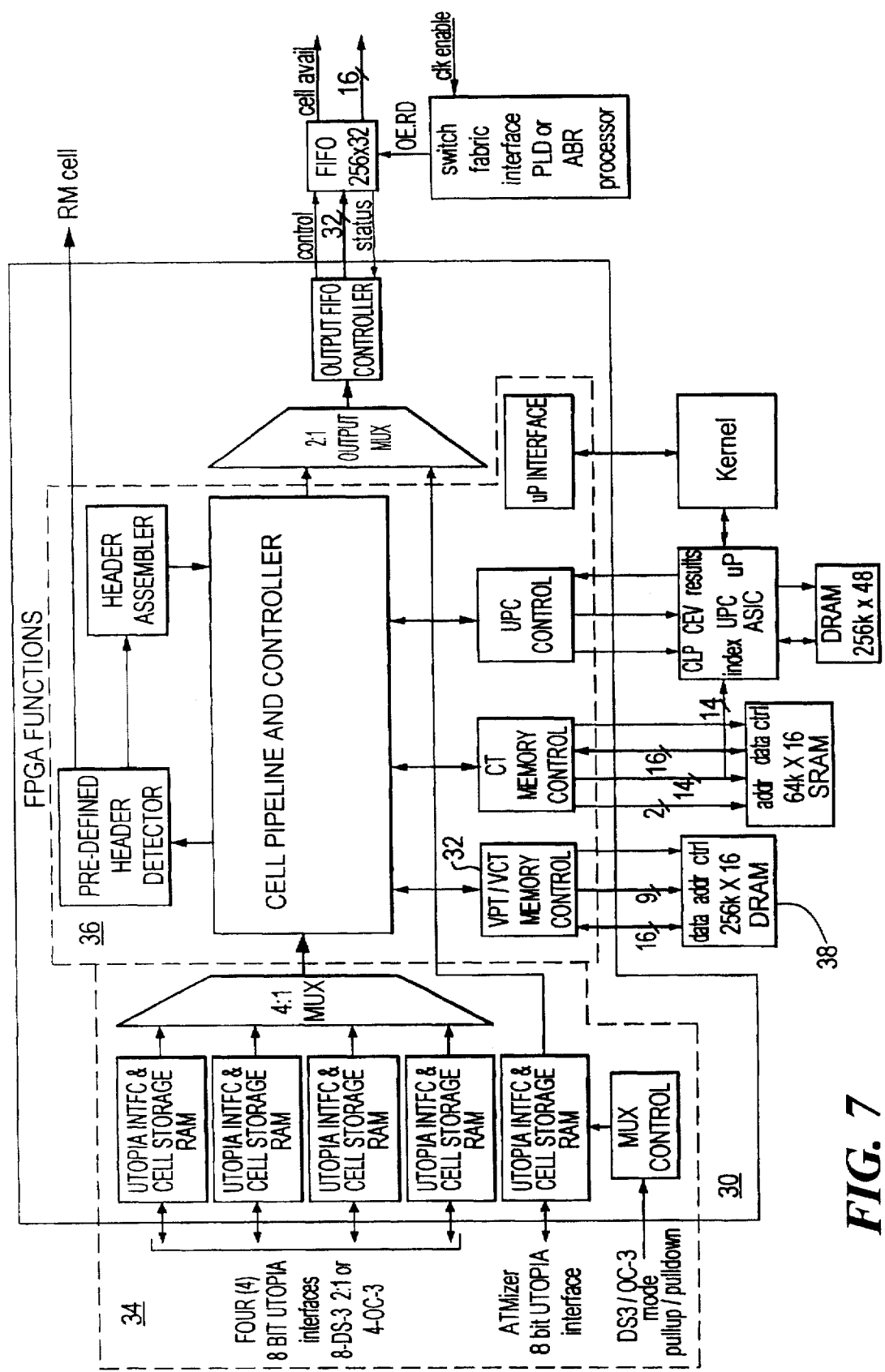
FIG. 7 is a block diagram of an ATM switch capable of executing the address translation in accordance with the present invention.

In one embodiment of the present invention, the address translation as described is executed within an ATM switch, of which FIG. 7 illustrates an input cell processor 30 for the ATM switch. Such processor 30 includes, among other elements, a Physical Interface and Muxing FPGA 34, also referred to as a PHY_MUX FPGA, and an Asynchronous Transfer Control FPGA 36, also referred to as an AT_CTRL FPGA.

Figure 8:
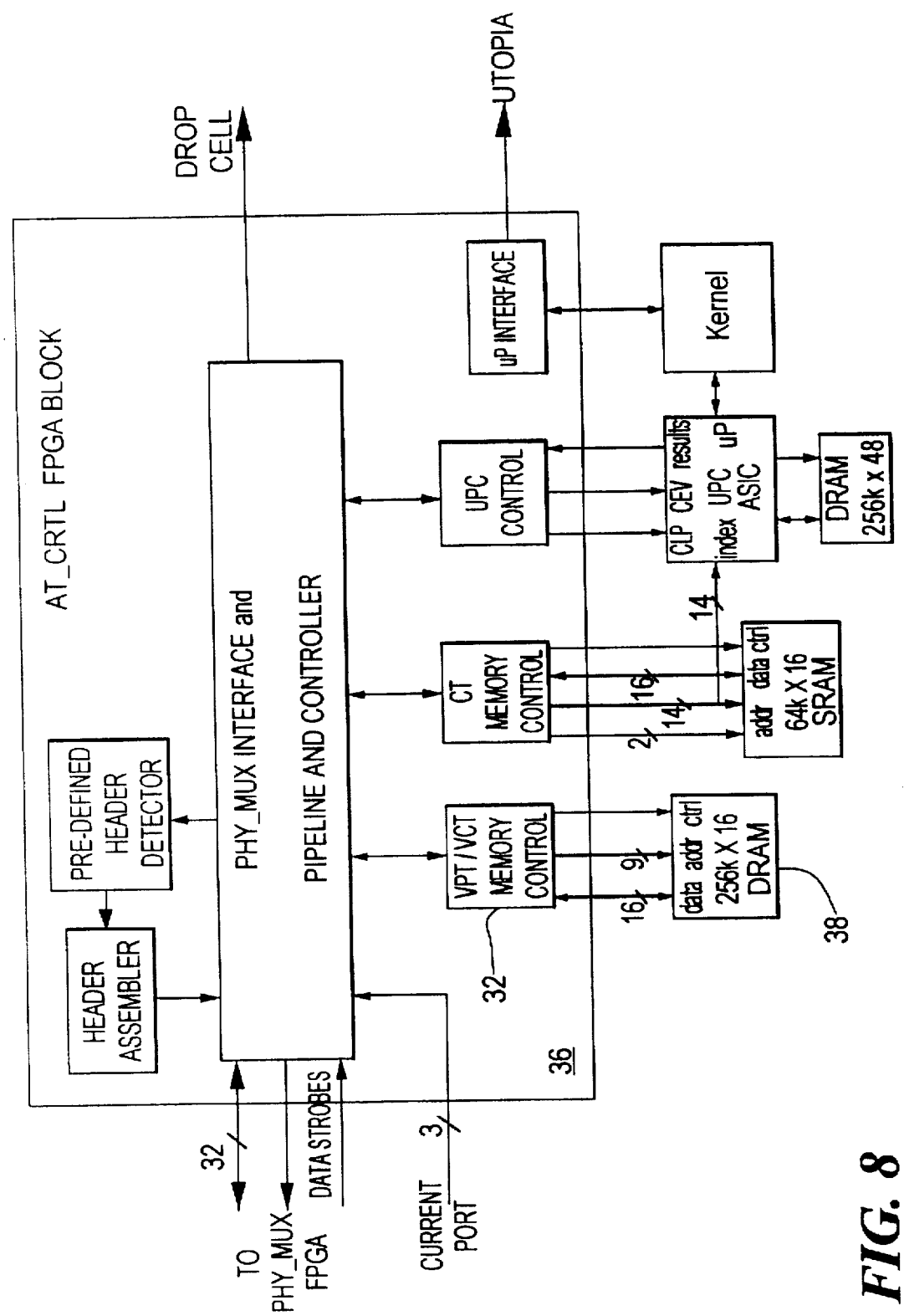
FIG. 8 is a block diagram of a field programmable gate array configured to perform the address translation of the present invention.

The PHY_MUX FPGA 34 acts as an interface and mux for the incoming ATM cell traffic, cell pipeline, and FIFO interface. The AT_CTRL FPGA 36, also illustrated in greater detail in FIG. 8, performs the functions of VPT/VCT memory controller and other functions related to the transfer of cells through the switch fabric. It is the VPT/VCT memory control function 32 which executes the address translation of the present invention. The routing table referred to above is identified as a 256K×16 DRAM 38 in FIGS. 7 and 8.

A print-out of a Verilog module is attached hereto as an appendix. This module is employed as a source for synthesizing the address translation technique as described in the foregoing in a FPGA. In addition, this module implements the addressing and analysis of data stored in the local routing table described above, both for VPT lookup and VCT lookup.

Having described preferred embodiments of the invention, it will be apparent to those skilled in the art that other embodiments incorporating the concepts may be used.

For instance, memory sizes described in the foregoing first embodiment may vary with further embodiments. For instance, if each port-specific routing table is 64K×16 rather than 16K×16, a sixteen bit address generated from the received VPI and VCI values would be required.

In yet other embodiments of the present invention, the address translation can be executed by a VPT/VCT memory control element implemented using discrete circuit elements, in an application specific integrated circuit (ASIC), or in software.

These and other examples of the invention illustrated above are intended by way of example and the actual scope of the invention is to be limited solely by the scope and spirit of the following claims.

What is claimed is:

1. An address translator for use in an ATM switch, said translator in communication with a range register providing a VPI range register value and a VCI range register value, each defining a maximum number of VPI or VCI bits employed in creating an internal address, said translator comprising:

a cell header analyzer for identifying received VPI and VCI values from an incoming cell;

a truncation element, in communication with said range register and said cell header analyzer, for truncating each of said received VPI and VCI values in accordance with a respective one of said VPI or VCI range register values;

an out-of-range checking element, in communication with said cell header analyzer and said truncation element, for comparing said received VPI and VCI values with said truncated VPI and VCI values, respectively, to determine if said received values are beyond said respective maximum number of bits;

a rotation element, in communication with said truncation element, for rotating one of said truncated VPI and VCI values; and a concatenating element, in communication with said truncation element and said rotation element, for concatenating said rotated, truncated value with a remaining non-rotated truncated value of VPI or VCI at either end of an internal address value.

2. The address translator according to claim 1, further comprising:

a zero padding element for inserting zero padding between said rotated and non-rotated values in said internal address value if said rotated and non-rotated values together have less bits than a number of bits required by said internal address value.

3. The address translator according to claim 1, wherein said translator is implemented in a field programmable gate array.

4. The address translator according to claim 1, wherein a summation of said VPI and VCI range register values is less than or equal to fourteen bits.

5. A method of address translation by a circuit in an ATM switch, comprising:

maintaining respective maximum numbers of VPI and VCI bits supported by said address translation method in a storage location associated with said circuit and within said switch;

separating VPI and VCI values from a header of a received ATM cell by said circuit;

truncating, in said circuit, said VPI and VCI values according to said respective VPI and VCI maxima;

reversing one of said truncated VPI or VCI values by said circuit; and concatenating, by said circuit, said reversed, truncated value with a remaining non-reversed, truncated value to form an internal address.

6. The method according to claim 5, wherein said step of maintaining further comprises storing said respective maximum numbers in a look-up table associated with said circuit.

7. The method according to claim 5, wherein said step of separating said VPI and VCI values further comprises separating, within said circuit, an eight bit VPI value if said switch is a UNI and separating a twelve bit VPI value if said switch is an NNI.

8. The method according to claim 5, wherein said step of truncating further comprises logically OR'ing said VPI and VCI values with said respective VPI and VCI maxima within said circuit.

9. The method according to claim 5, wherein said step of truncating further comprises comparing, using said circuit, said truncated and received VPI and VCI values, respectively, to identify unsupported received values.

10. The method according to claim 9, wherein said step of comparing further comprises the steps of:

XOR'ing, in said circuit, said truncated and received VPI and VCI values, respectively; and OR'ing bits which result from each respective step of XOR'ing, by said circuit, to produce respective VPI and VCI test bits; and identifying unsupported received VPI or VCI values by identifying test bits having a value of logical one.

11. The method according to claim 5, wherein said step of reversing is implemented in hardware such as by reversing the order of electrical conductors.

12. The method according to claim 5, wherein said step of concatenating further comprises padding said internal address by inserting bits having a logical zero value between said reversed, truncated value and said remaining non-reversed, truncated value.

13. A method of address translation implemented in a field programmable array (FPGA) disposed within an ATM switch receiving an ATM cell, said method comprising, using said FPGA:

separating received VPI and VCI values from said received ATM cell;

truncating each of said received VPI and VCI values according to respective range register values stored in association with said FPGA;

reversing said truncated VPI value wherein said truncated VPI value reads LSB to MSB while said truncated VCI value reads MSB to LSB; and concatenating said reversed, truncated VPI value with said truncated VCI value in a local address word, wherein said word reads VPI LSB to VPI MSB, then VCI MSB to VCI LSB.

14. The method according to claim 13, wherein said step of concatenating further comprises padding said local address word with zeros between said reversed, truncated VPI value and said truncated VCI value.

15. The method according to claim 13, further comprising the steps of:

exclusive-OR'ing said received VPI and VCI values with respective truncated VPI and VCI values;

OR'ing results of said exclusive-OR step together to form respective VPI and VCI test bits; and determining if said respective test bits are equal to logic "one", indicative of a received value of VPI or VCI unsupported by said FPGA.

16. The method according to claim 13, wherein said step of truncating further comprises OR'ing said VPI and VCI values with said respective range register values.

* * * * *